H. L. VAN VALKENBURG.
ELECTRICAL INDICATING INSTRUMENT.
APPLICATION FILED SEPT. 29, 1906.
925,403.
Patented June 15, 1909.
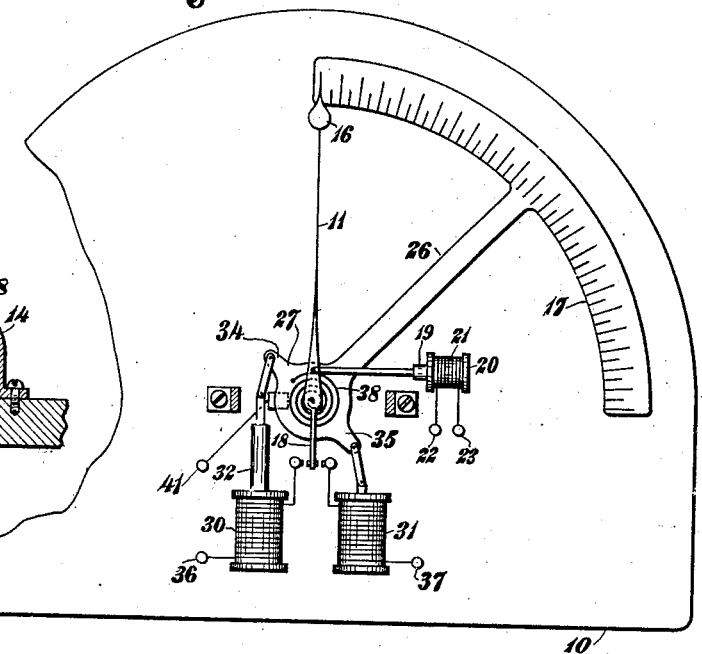
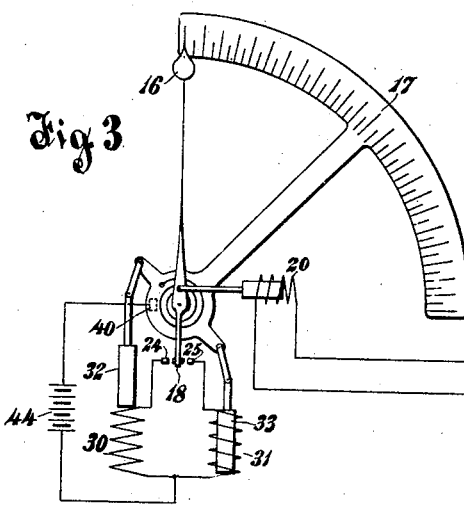
Witnesses
Inventor.
Hermon L. Van Valkenburg
By
Chas. E. Lord
Attorney

UNITED STATES PATENT OFFICE.

HERMON L. VAN VALKENBURG, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

ELECTRICAL INDICATING INSTRUMENT.

No. 925,403.  Specification of Letters Patent.  Patented June 15, 1909.

Application filed September 29, 1906. Serial No. 336,671.

*To all whom it may concern:*

Be it known that I, HERMON L. VAN VALKENBURG, citizen of the United States, residing at Norwood, in the county of Hamilton and State of Ohio, have invented certain new and useful Improvements in Electrical Indicating Instruments, of which the following is a full, clear, and exact specification.

My invention relates to electrical measuring instruments.

One of the objects of my invention is to provide an instrument having a long scale of widely distributed graduations.

A further object is to provide an instrument which is very sensitive and accurate for all readings throughout the range of the instrument.

In carrying out my invention I provide a movable scale and a movable indicator, the former remaining normally stationary until the indicator moves a predetermined distance, or until the value to be measured exceeds a predetermined amount.

More specifically considered, my invention consists in an electrical measuring instrument having a movable indicator, and a movable scale, and an actuating device for each, the parts being so arranged and constructed that when the value to be measured is small, the indicator moves and the scale remains stationary, but when the value to be measured reaches a certain predetermined amount, or when the indicator has moved a predetermined distance, the scale then moves in the opposite direction, the actuating device for the scale being controlled by the indicator.

My invention still further consists in the combinations and arrangements of parts described in the specification and set forth in the appended claims.

For a better understanding of my invention reference is had to the accompanying drawings in which—

Figure 1 is a sectional plan view of my improved measuring instrument; Fig. 2 is a partial vertical sectional elevation of the same; and Fig. 3 is a diagrammatic view showing the circuit connections.

Referring now to the figures of the drawing, 10 represents an insulating base upon which the working parts of the instrument are mounted.

At 11 is a needle or indicator carried by a short spindle 12 pivoted between jewel bearings 13, which may be supported in any desirable manner. In this instance the upper bearing is adjustably mounted in a bracket 14 secured to the base, and the lower bearing is mounted in the upper end of a plug or spindle 15 adjustably mounted in the base. The needle is provided at one end with a pointer 16 extending forward to a graduated scale 17, and with a comparatively short rearwardly extending arm 18.

In the usual constructions of electrical measuring instruments the needle or indicator moves relatively to a stationary scale, or the scale moves relatively to a stationary indicator. In such instruments the range of movement is generally limited and furthermore the movement of the movable element for a certain variation of current or voltage is usually not the same at all points in its range of movement. In my improved instrument, these and other difficulties are overcome by arranging both the indicator and scale for movement, the indicator having only a slight range of movement and only moving for measuring small values of current or voltage, and the scale being movable in the opposite direction to that in which the indicator moves when the current or voltage exceeds a definite predetermined amount.

The indicator may be actuated by any suitable electromagnetic motive device having one or more coils connected to the circuit, and sensitive to slight values of current or voltage. In this case the indicator is connected to the movable core 19 of a solenoid 20 having a coil 21, the terminals of which are connected to binding posts 22 and 23. The coil may be a current coil or a voltage coil, or if desired the solenoid may be provided with both a current and a voltage coil so that the pull and movement is proportional to the watts. In the last mentioned case, either the voltage coil or the current coil would generally be wound on the movable core of the solenoid. The movement of the indicator is limited in each direction by stationary contact members 24 and 25 arranged a suitable distance apart and on opposite sides of the rearwardly extending arm 18. The scale 17 is in this case arranged for pivotal movement about the axis of the needle. The scale is provided with a radial arm 26 having an enlarged head or flange 27, and a hub 28 which is mounted on the end of the plug or spindle 15, being held in place by a nut 29. The accuracy of the instrument is not affected by the friction of the scale on its bearing, in fact the friction is preferably made considerable so that the scale will more readily remain in its proper position when moved by its actuator.

Any suitable means may be provided for moving the scale 17. In this case, I have shown two solenoids 30 and 31 having cores 32 and 33 connected to short radial arms 34 and 35 extending outward from opposite sides of the flange 27, for moving the scale to the left and right respectively. The terminals of the coil of solenoid 30 are connected respectively to contact 24 and to a binding post 36 and the terminals of the coil of solenoid 31 are connected to contact 25 and to a binding post 37 respectively. The solenoid coils may be connected to any constant source of current such as a battery or in shunt to the conductors of the main circuit. At 38 is shown a fine spiral spring connected at one end to the spindle 12 of the indicator and at its other end to a pin or other projection 39 of the flanged portion 27 of the scale. The purpose of the spring is to return the needle to its zero position, to oppose the torque of the coil and core of the actuating solenoid 20, and to balance the pull of the scale-moving solenoids, as will be explained.

Bearing on the under side of the flange 27 is a leaf spring or brush 40 which is electrically connected to a binding post 41.
The brush 40 serves a two-fold purpose, namely, to convey current to the indicator, which closes the circuit through one or the other of the solenoids 30 or 31 when the rearwardly extending arm engages contact 24 or 25, and to put a drag on the scale so as to render the instrument dead beat. If desired, the drag may be dispensed with and the current conveyed to the indicator by some other means such as a fine flexible conductor.

The purpose and operation of the different parts of the instrument will now be more fully explained, reference being had particularly to Fig. 3. Coil 21 is connected to the circuit conductors 42 and 43, which as explained before may connect the coil in series or in shunt to the load. The scale-actuating solenoids are in this case connected to a battery 44, one terminal of which is also connected to the brush 40. Normally the indicator and scale are in the position shown in Figs. 1 and 3, the rearwardly extending arm 18 of the needle being approximately midway between the contacts 24 and 25 and the scale being at the extreme right hand position. When there is a passage of current through the coil 21 of solenoid 20, the indicator is moved to the right over the scale, which remains stationary when the value of the current in the coil is small. The indicator may be very light so that the friction in its bearings is almost negligible. The solenoid is connected to the indicator near its pivotal center so that the movement of the solenoid core is very slight. The position of the solenoid core can be so adjusted that the pull and movement is exactly proportional to the value of the current passing through the solenoid coil.

When the value of the current in the solenoid 21 exceeds a certain predetermined amount the indicator reaches its limiting position with the arm 18 in engagement with contact 24, and the circuit is completed through the coil of solenoid 30, the current being conveyed to the indicator through the brush 40, flange 27 of the scale and spiral spring 38. The core of solenoid 30 is now moved into the coil, moving the scale to the left and winding up the spring 38 until the pull of the spring barely exceeds the pull of solenoid 20. The pull of the spring moves the arm 18 of the indicator away from contact 24, breaking the circuit through the coil of the solenoid 20. The scale now remaining in the same position, the pull of the solenoid 20 being insufficient to overcome the friction of the scale on its bearing and the drag, if any, due to the brush 40, the indicator almost immediately assumes a stationary position with the arm 18 out of engagement with either contact, and the positions of the indicator and scale is an accurate indication of the current traversing the indicator motive device. As the current through the coil of solenoid 20 decreases, the pull of the solenoid decreases and the spiral spring moves the indicator to the left until the arm 18 engages contact 25, closing the circuit through the coil of solenoid 31 to cause the scale to move to the right and unwind the spring 38. This movement continues until the pull of the spring is barely less than that of the solenoid 20, whereupon the arm 18 leaves the contact 25 and equilibrium is again immediately restored. When the instrument is disconnected from the main circuit the spiral spring pulls the indicator to the left until the arm 12 engages contact 25, completing the circuit through the coil of solenoid 31 which restores the scale to its normal position shown in the drawing, the indicator assuming a zero position with the arm 18 approximately midway between contacts 24 and 25.

The mechanical connections between the indicator and the solenoid 20, and between the scale and solenoids 30 and 31 are preferably near the pivotal centers of the indicator and scale so that comparatively large movements are given the pointer and scale by small movements of the cores of the actuating solenoids. The normal position of the core 19 can be so selected that the movements of the indicator and scale, for uniform changes of current in the actuating solenoid coil 20, are uniform through their ranges of movement. Furthermore the scale can be given a long range of movement so that the graduations can be widely separated. It will also be seen that the accuracy of the instrument is little affected by friction of the moving parts since the friction of the movable scale can not affect the instrument.

It is evident that my invention can be embodied in a large number of forms or modifications, and I therefore do not wish to be confined to the specific details or arrangements of parts here shown.

What I claim as new is:—

1. In an electrical measuring instrument, a movable indicator, a movable scale, and means for moving the scale only after the indicator has moved a predetermined distance.

2. In an electrical measuring instrument, an indicator and a movable scale, and means for automatically moving said scale only when the electrical condition to be measured exceeds a predetermined amount.

3. In an electrical measuring instrument, a movable pointer or indicator, a movable scale, and power operated means for moving said indicator and scale successively but in opposite directions upon a sufficiently large variation in the value of the quantity to be measured.

4. In an electrical measuring instrument, a movable indicator, a movable scale, means for moving one of said members only when the value to be measured is less than a certain predetermined amount, and means for moving the other of said members when the value to be measured exceeds that amount.

5. In an electrical measuring instrument, a movable indicator, a movable scale, means for moving one only of said members for small variations in the value of the quantity to be measured, and both of said members for large variations in the value of the same quantity.

6. In an electrical measuring instrument, a movable pointer or indicator, a movable scale, means for moving only said indicator for small electrical measurements, and means for moving said scale for large measurements of the same quantity.

7. In an electrical measuring instrument, a movable indicator, a movable scale, and a motive device for each of said movable parts, the motive device of one of said parts being controlled by the other.

8. In an electrical measuring instrument, a movable indicator, a movable scale, and means for causing a movement of the scale when the indicator reaches a certain position.

9. In an electrical measuring instrument, a movable indicator, a movable scale, and means for causing a movement of the scale in one direction when the indicator has moved a predetermined distance in the opposite direction.

10. In an electrical measuring instrument, an indicator having a limited range of movement, a scale having a greater range of movement, and a motive device for each of said members, the motive device of the scale being controlled by the indicator.

11. In an electrical measuring instrument, an indicator, a motive device therefor, a movable scale, a motive device therefor, and means for closing the circuit through the motive device of the scale when the indicator has moved a predetermined distance.

12. In an electrical measuring instrument, an indicator, an electromagnetic motive device therefor, a movable scale, and an electromagnetic motive device therefor, said last named motive device having a circuit controlled by the movement of the indicator.

13. In an electric measuring instrument, a movable indicator, a movable scale coöperating with said indicator, a motive device for said indicator, said motive device being controlled by the electrical quantity to be measured, and a motive device for said scale, said last named motive device being controlled by said indicator.

14. In an electrical measuring instrument, a movable indicator, a movable scale, and a motive device for each of said movable parts, one of said motive devices being controlled by the position of the movable part operated by the other motive device, and said last mentioned motive device being controlled by the electrical quantity to be measured.

15. In an electrical measuring instrument, an indicator having a limited range of movement, a movable scale coöperating therewith, and a motive device for each of said members, the motive device for the scale being operative only when the indicator is at one of its limits of movement.

16. In an electrical measuring instrument, an indicator having a limited range of movement, a movable scale coöperating therewith, a motive device for causing movements in opposite directions upon the rise and fall respectively in the value of the electrical quantity to be measured, and a motive device for moving said scale to continue in the same direction the relative movement between said indicator and said scale when the indicator has reached the limit of its movement.

17. In an electric measuring instrument, a movable member having a limited range of movement, a second movable member, said two movable members coöperating to form the indicator and scale of the measuring instrument, a motive device for said first movable member, said motive device being controlled by variations in the electrical quantity to be measured, and a motive device for said second movable member, said last named motive device being operative only when said first movable member is at one of its limits of movement.

18. In an electrical measuring instrument, an indicator, a movable scale, and automatic means for moving said scale only when variations in the electrical quantity to be measured exceed a predetermined amount.

19. In an electrical measuring instrument, a movable indicator, a movable scale, means for moving only one of said members when variations in the value to be measured are less than a predetermined amount, and means for moving the other of said members when such variations exceed that amount.

20. In an electrical measuring instrument, a movable indicator or pointer, a movable scale, means for moving said indicator for small changes in the electrical condition to be measured, and means for moving said scale for large changes in the same quantity.

In testimony whereof I affix my signature, in the presence of two witnesses.

HERMON L. VAN VALKENBURG.

Witnesses:
ARTHUR F. KWIS,
FRED J. KINSEY.